US010037688B2

(12) United States Patent
Wessling

(10) Patent No.: US 10,037,688 B2
(45) Date of Patent: Jul. 31, 2018

(54) COMMUNICATION SYSTEM FOR CONNECTING FIELD DEVICES TO A HIGHER-ORDER CONTROL DEVICE

(75) Inventor: Klaus Wessling, Bueckeburg (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 291 days.

(21) Appl. No.: 13/704,190

(22) PCT Filed: Jun. 28, 2011

(86) PCT No.: PCT/EP2011/003161
§ 371 (c)(1),
(2), (4) Date: May 16, 2013

(87) PCT Pub. No.: WO2012/000641
PCT Pub. Date: Jan. 5, 2012

(65) Prior Publication Data
US 2013/0222123 A1 Aug. 29, 2013

(30) Foreign Application Priority Data
Jun. 29, 2010 (DE) .................. 10 2010 025 515

(51) Int. Cl.
G05B 11/01 (2006.01)
G08C 19/00 (2006.01)
(Continued)

(52) U.S. Cl.
CPC ......... G08C 19/00 (2013.01); G05B 19/0423 (2013.01); H04L 12/40019 (2013.01);
(Continued)

(58) Field of Classification Search
USPC .......................................................... 700/1
See application file for complete search history.

(56) References Cited

U.S. PATENT DOCUMENTS 5,121,410 A * 6/1992 Demarais .............. H04L 5/1461
178/71.1
5,136,498 A * 8/1992 McLaughlin ....... G06F 11/2017
700/3
(Continued)

FOREIGN PATENT DOCUMENTS

CN 1388685 A 1/2003
CN 101523310 A 9/2009
(Continued)

OTHER PUBLICATIONS

Internet Citation, "IO-Link Communication Specification, Version 1.0", "URL:http://www.io-link.com/share/Downloads/IOL-Comm-Spec_10002_V10_090118.pd", Jan. 2009, vol. 1, Publisher: IO-Link, Published in: DE.
(Continued)

Primary Examiner — Joseph Feild
Assistant Examiner — Rufus Point
(74) Attorney, Agent, or Firm — Kaplan Breyer Schwarz, LLP

(57) ABSTRACT

To be able to achieve shorter communication cycles, the invention proposes a communication system which is able to connect field devices to a higher-order control device. For this purpose, a connection device is provided which is connectable to a higher-order control device via a transmission medium. The connection device has at least one first port and at least one second port, to each of which a field device may be connected. The connection device has at least one functional device which is switchable between at least one first port and at least one second port. The functional device is designed to generate output data intended for the second port in response to the input data arriving at the first port.

5 Claims, 1 Drawing Sheet

(51) Int. Cl.
  *G05B 19/042* (2006.01)
  *H04L 12/40* (2006.01)
  *G06Q 10/06* (2012.01)
  *G05B 15/02* (2006.01)
  *H04N 21/4363* (2011.01)
  *H04N 21/436* (2011.01)

(52) U.S. Cl.
  CPC .... *G05B 15/02* (2013.01); *G05B 2219/25274* (2013.01); *G05B 2219/25335* (2013.01); *G06Q 10/06* (2013.01); *H04L 2012/4026* (2013.01); *H04N 21/43615* (2013.01); *H04N 21/43637* (2013.01)

(56) References Cited

U.S. PATENT DOCUMENTS

| | | | | |
|---|---|---|---|---|
| 5,202,822 | A * | 4/1993 | McLaughlin | G06F 11/2017 700/82 |
| 5,255,388 | A * | 10/1993 | McLaughlin | G06F 11/1658 |
| 5,261,092 | A * | 11/1993 | McLaughlin | G06F 11/1658 700/3 |
| 5,339,237 | A * | 8/1994 | Mody | G05B 9/02 700/79 |
| 5,991,233 | A * | 11/1999 | Yu | G11C 7/1072 365/189.05 |
| 6,567,708 | B1 * | 5/2003 | Bechtel | E06B 9/24 359/275 |
| 6,999,824 | B2 * | 2/2006 | Glanzer | G05B 9/02 700/17 |
| 7,228,186 | B2 * | 6/2007 | Karschnia | G05B 19/054 370/410 |
| 7,272,457 | B2 * | 9/2007 | Glanzer | G05B 15/02 700/83 |
| 7,367,712 | B2 * | 5/2008 | Becker | G01K 7/20 327/512 |
| 7,462,041 | B2 * | 12/2008 | Bormann | G05B 9/02 439/76.1 |
| 7,582,989 | B2 * | 9/2009 | Burr | H01H 47/005 307/115 |
| 7,589,651 | B1 * | 9/2009 | Shumarayev | H03K 19/17732 326/37 |
| 7,886,086 | B2 * | 2/2011 | Sharma | G06F 9/5077 710/29 |
| 8,149,102 | B1 * | 4/2012 | Miller | H04W 4/006 340/506 |
| 8,332,567 | B2 * | 12/2012 | Burr | G05B 19/042 710/25 |
| 8,626,319 | B2 * | 1/2014 | Weatherhead | G06Q 50/06 700/22 |
| 8,769,412 | B2 * | 7/2014 | Gill | G06F 21/55 702/185 |
| 2004/0194101 | A1 * | 9/2004 | Glanzer | G05B 15/02 718/100 |
| 2005/0288799 | A1 * | 12/2005 | Brewer | G05B 19/05 700/1 |
| 2009/0083446 | A1 * | 3/2009 | Konieczny | G05B 19/052 710/2 |
| 2011/0266357 | A1 * | 11/2011 | Orcutt | A01B 79/005 239/1 |
| 2012/0078392 | A1 * | 3/2012 | Woehrle | G05B 9/03 700/86 |

FOREIGN PATENT DOCUMENTS

| | | |
|---|---|---|
| DE | 102004015616 A1 | 11/2004 |
| EP | 2042953 A2 | 4/2009 |
| EP | 2161638 A1 | 3/2010 |
| EP | 2182418 A2 | 5/2010 |
| GB | 2452617 A | 3/2009 |
| JP | 2002149232 A1 | 5/2002 |
| WO | 2009118032 A1 | 10/2009 |

OTHER PUBLICATIONS

Stefan Hristov, "International Application No. PCT/EP2011/003161 International Search Report", dated Dec. 27, 2011, Publisher: PCT, Published in: EP.

"Related Chinese Patent Application No. CN 2011 80032043.2", "First Office Action", dated Jun. 16, 2014, Publisher: SIPO, Published in: CN.

Stefan Hristov, "International Application No. PCT/EP2011/003161 International Search Report", dated Dec. 27, 2011, Publisher: PCT, Published in: EP.

"Related German Patent Application No. 10 2010 025 515.7", "German Office Action", dated Oct. 28, 2014, Publisher: DPM, Published in: DE.

Siemens AG, "Ausbildungsunterlagen fr die durchgngige [= Training Document for the integrated Automation Solution] Totally integrated Automation (TIA)", "Grundlagen zu Feldbussystemen mit SIMATIC [= Basics of Fieldbus Systems with SIMATIC] S7-300", Sep. 2006, pp. 1-65, vol. Appendix IV, Publisher: Corporate Publications, Published in: DE.

"Chinese Patent Application No. CN 2011-80032043.2", "Second Office Action", dated Feb. 3, 2015, Publisher: SIPO, Published in: CN.

"Office Action" issued in co-pending EP Counterpart Patent Application No. 11 741 097.7, dated Jan. 14, 2016.

Siemens, "Basissoftware fuer S7-300/400 PID Control", "C79000-G7000-0516-01 Handbook", Dec. 31, 1996, Publisher: Simatic; Siemens Aktiengesellschaft; XP055238366.

"Was ist eigentlich.[ What is actually . . . ] IO-Link", "Mess Tec & Automation", Sep. 2006, pp. 38-40, vol. ISSN 1439-7463, No. 9, Publisher: GIT VERLAG GmbH & Co. KG, Published in: Darmstadt, DE.

K. F. Fruh, Editor, "Handbuch der Prozessauto-matisierung [Handbook of Process Automation]", 2000, pp. 106-110, vol. 2nd Edition, Publisher: Oldenburg Industrieverlag GmbH; ISBN:3-486-27008-7, Published in: Munich, DE.

"Technical University Darmstadt:: Lecture: Aktuatorik in der Prozessautomatisierung [Actuating Elements in the Process Automation of Process Plants, 1 Process Automation]", Spring, 2009, Publisher: URL: http://www.fst.tu-darmstadt.de/media/fachgebiet_fst/dokumente/lehre/Studienmaterial/apva/voelesung_aktuatorikinderprozess, Published in: Darmstadt, DE.

Siemens AG, "Simatic technology Regeln mit Simatic Kurzbeschreibung [= Rules with Simatic Short description]", "Automation and Drives", Aug. 2003, Publisher: Siemens Aktiengesellschaft, Published in: Nuernberg, DE.

"Office Action" issued in counterpart European patent application No. 11741097.7, dated Sep. 22, 2016, Published in: EP.

* cited by examiner

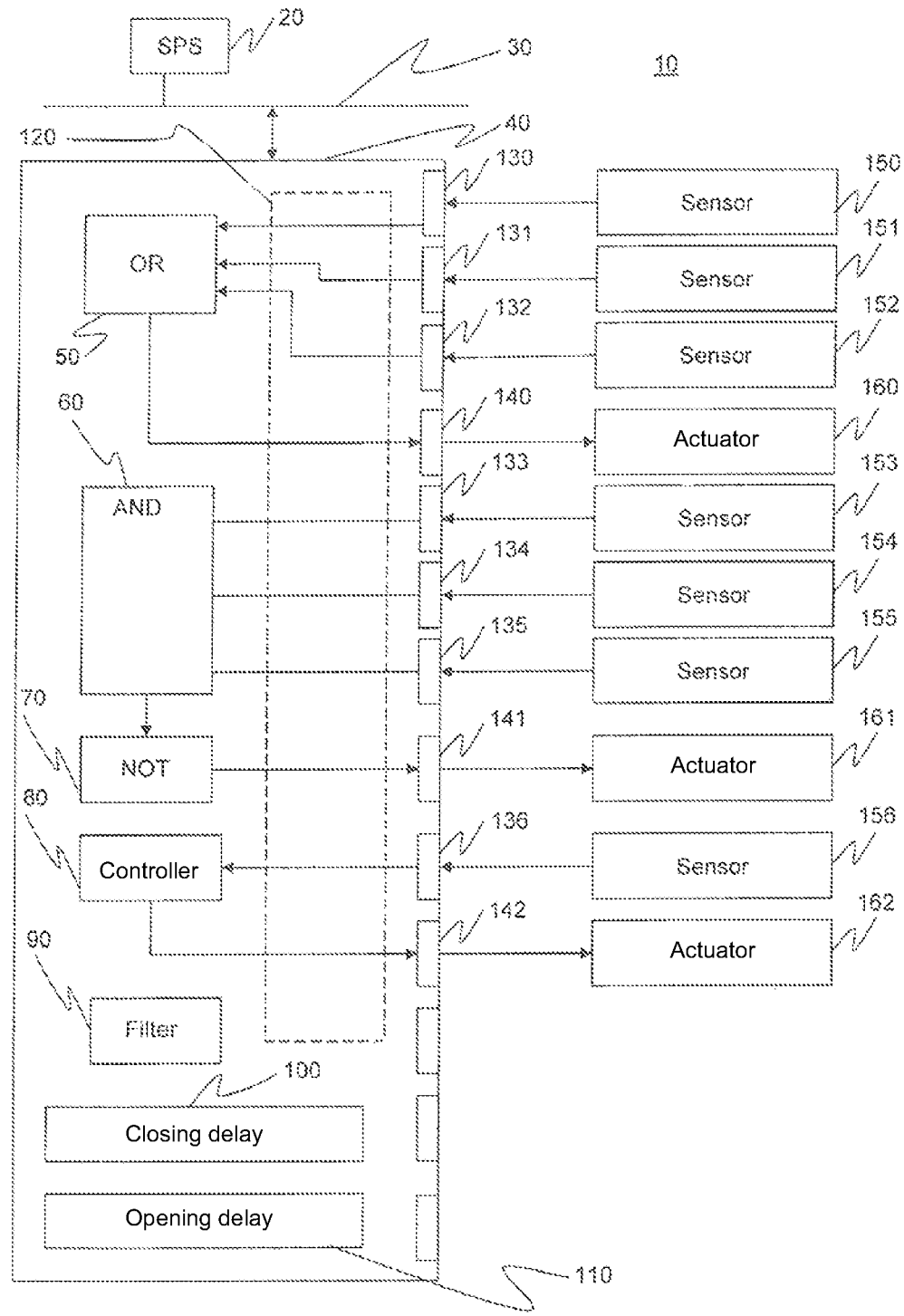

COMMUNICATION SYSTEM FOR CONNECTING FIELD DEVICES TO A HIGHER-ORDER CONTROL DEVICE

FIELD OF THE INVENTION

The invention relates to a communication system for connecting field devices, in particular sensors and actuators, to a higher-order control device. The invention further relates to a connection device which is suitable for use in such a communication system.

BACKGROUND OF THE INVENTION

To be able to connect field devices within an automated system to a higher-order control device, for example a stored program control (SPC), in an efficient and cost-effective manner, standardized connection systems, known as IO-Link communication systems, have been known for quite some time. The IO-Link communication system is a standardized point-to-point connection system. IO-Link devices, which are primarily sensors, actuators, or combinations thereof, are connected via separate point-to-point connections to an IO-Link master, which in turn may be connected to an SPC. Each IO-Link device is connected to a separate IO-Link port of the IO-Link master. Depending on the configuration, the IO-Link ports function as digital inputs or outputs. In addition, IO-Link ports may be configured in such a way that they are able to establish cyclical communication with a connected IO-Link device. One task of the IO-Link master is to collect the input process data arriving at the ports from the connected IO-Link devices, and transmit them to the SPC via a higher-order field bus. The SPC has specialized functional devices which map the received input process data onto output process data. These output process data are subsequently sent from the SPC to the IO-Link master. The IO-Link master distributes the received output process data over the appropriate IO-Link ports, which then send output process data to the corresponding IO-Link devices. However, this communication cycle may take too long for some applications in which IO-Link input process data must be mapped more quickly onto IO-Link output process data.

SUMMARY OF THE INVENTION

The object of the invention, therefore, is to provide a communication system and a connection device for connecting field devices to a higher-order control device, which allow input process data to be mapped more quickly onto output process data.

A core concept of the invention is to provide a connection device which may be connected to a higher-order control device via a transmission medium. Multiple field devices may be connected to the connection device. The connection device has functional devices which map the input data received from at least one field device onto output data. The connection device subsequently transmits the output data to a destination field device. Since these processing steps are now carried out in the connection device itself, not in a higher-order control device, shorter communication cycles for exchanging process data may be achieved.

Another core concept is that the connection device is a modified IO-Link master, and the field devices are IO-Link devices.

Accordingly, a communication system for connecting field devices to a higher-order control device is provided.

The communication system has a connection device which is connectable to a higher-order control device via a transmission medium. The connection device has at least one first port, to which a field device which generates input data is connected, and at least one second port, to which a field device which receives output data is connected. To be able to achieve shorter communication cycles and to allow the higher-order control device to be relieved of load, the connection device has at least one functional device which is switchable between at least one first port and at least one second port. The functional device is designed to generate output data intended for the second port in response to the input data arriving at the first port.

It is noted at this point that the transmission medium may be a higher-order field bus, for example according to the Ethernet standard. "Input data" are understood to mean data that are generated by a field device and transmitted to the connection device, i.e., input data for the connection device. Similarly, output data are data that are transmitted by the connection device to a field device, and thus represent output data for the connection device.

According to one advantageous embodiment, the communication system forms a modified IO-Link communication system in which the field devices are IO-Link devices, in particular sensors and actuators. In this case, the connection device communicates with the particular IO-Link devices via point-to-point connections according to the IO-Link protocol. In this embodiment, the connection device may also be regarded as a modified IO-Link master.

To expand the potential uses for the communication system and to increase its flexibility, the connection device has multiple different functional devices and a programmable switching device. The switching device is designed in such a way that it is able to switch at least one functional device between at least one first port and at least one second port.

It is noted at this point that the functional devices may implement different logical or arithmetic functions. It is also conceivable for the functional devices to be implemented as controllers, filters, closing delay devices, or opening delay devices. Depending on the desired application, it is possible to connect multiple functional devices in series so that the input data arriving at a port are able to run through a multistep processing operation before they are output to a field device. A desired overall function may thus be realized by the targeted interconnection of multiple functional devices.

According to one advantageous refinement, the input data and output data contain process data which may be transmitted cyclically. The input data and output data are preferably sent in telegrams, which may also contain the port number of the corresponding first port or second port, as well as the length of the telegram or of the process data. The length may be expressed in bits or bytes.

Accordingly, a connection device is provided which in particular is suitable for use in a communication system for connecting field devices to a higher-order control device. The connection device has at least one first port, to which a field device which generates input data is connectable, and at least one second port, to which a field device which receives output data is connectable. In addition, at least one functional device is provided which is switchable between at least one first port and at least one second port. The functional device is designed to generate output data intended for the second port in response to the input data arriving at the first port.

BRIEF DESCRIPTION OF THE DRAWINGS

The invention is explained in greater detail below with reference to one exemplary embodiment, in conjunction with one figure.

FIG. 1 depicts the salient components of a communication system 10 in accordance with an illustrative embodiment of the present invention.

DETAILED DESCRIPTION OF THE INVENTION

The figure shows a communication system 10, for example in the form of an automated facility. The communication system 10 has a higher-order control device 20 which is connected to a transmission medium 30, for example a field bus. Also connected to the field bus 30 is a connection device 40, which with regard to the selected exemplary embodiment may also be referred to as an IO-Link connection device or modified IO-Link master. Solely for simplicity of the illustration, only one connection device 40 is shown. The connection device 40 may contain all functions of a standardized IO-Link master. However, to be able to transmit process data in shorter communication cycles within the communication system 10, the modified IO-Link master 40 also has a plurality of different functional devices 50, 60, 70, 80, 90, 100, 110. For example, the functional device 50 is implemented as an OR gate, the functional device 60 as an AND gate, the functional device 70 as an inverter, the functional device 80 as a controller, the functional device 90 as a filter, the functional device 100 as a closing delay device, and the functional device 110 as an opening delay device. In addition, the connection device 40 has multiple ports 130 through 136 which are configurable as input ports, and multiple ports 140 through 142 which are configurable as output ports. In the present example, a sensor is connected to each input port via a separate point-to-point connection. Thus, a sensor 150 is connected to the input port 130, a sensor 151 is connected to the input port 131, a sensor 152 is connected to the input port 132, a sensor 153 is connected to the input port 133, a sensor 154 is connected to the input port 134, a sensor 155 is connected to the input port 135, and a sensor 156 is connected to the input port 136. Similarly, in the described example an actuator 160 is connected to the output port 140, an actuator 161 is connected to the output port 141, and an actuator 162 is connected to the output port 142. The data which are provided by the sensors 150 through 156 and transmitted to the connection device 40 are referred to as input data, whereas the data transmitted from the connection device 40 to the actuators 160 through 162 via the respective output ports are referred to as output data. It is noted at this point that the input data are input process data, and the output data are output process data for controlling the actuators.

According to the described exemplary embodiment, the output device 40 and the sensors and actuators connected thereto form a connection system, which may also be referred to as a modified IO-Link communication system. The sensors and actuators are implemented as IO-Link devices.

Furthermore, the connection device 40 has a schematically illustrated programmable switching or control device 120. The task of the switching device 120 is to lead the input data arriving at least one input port 130 through 136 through one or more functional devices in dependence on the specified system implementation in order to obtain the desired output data. The output data are then supplied to a corresponding output port to which the destination actuator is connected. In the implementation of the connection device 40 by way of example, the input ports 130, 131, and 132 are connected to the functional device 50. In other words, the input process data arriving from the sensors 150, 151, and 152 are linked in the functional device 50 according to an OR function. The input process data are preferably transmitted to the connection device 40 in telegrams in definable communication cycles. The input data present in a telegram may contain, in addition to the mentioned input process data, the port number of the particular input port, a bit offset, and the length of the telegram or the quantity of process data, expressed either in units of bits or bytes. Thus, the port number of the input port 130 is transmitted in a telegram provided by the sensor 150, the port number of the input port 131 is transmitted in a telegram provided by the sensor 151, and the port number of the input port 132 is transmitted in a telegram provided by the sensor 152. The input port 130 or some other suitable device reads the input process data received in the telegram and transmits same to the input of the functional device 50. In addition, the input port 130 or some other suitable device may check the port number of the input port 130 contained in the received telegram as to whether the received input process data have actually arrived from the correct source, i.e., the sensor 150. The telegrams arriving from the sensors 151 and 152 are processed in a similar manner.

At the output side the functional device 50 is connected to the output port 140. As a result, the output process data generated by the functional device 50 are supplied to the output port 140, and from there are transmitted to the actuator 160 in a communication cycle. The output process data are preferably transmitted to the actuator 160 in telegrams in definable communication cycles. The output data present in a telegram may contain, in addition to the mentioned output process data, the port number of the output port 140, a bit offset, and the length of the telegram or the quantity of process data, expressed either in units of bits or bytes. The port number of the output port 140 contained in a telegram may be checked by the actuator 160 as to whether the received output process data are actually intended for the actuator 160.

The functional device 50 or some other device generates an outgoing telegram in which the output process data of the functional device 50, the port number of the output port 140, and a bit offset and optionally also the length of the telegram are written. The output telegram is then transmitted via the port 140 to the actuator 160, which performs the desired operation in response to the corresponding output process data.

The connection device by way of example also shows that the input ports 133, 134, and 135 are connected by means of the switching device 120 to the functional device 60, which processes the input data of the sensors 153, 154, and 155 according to an AND operation. In the illustrated example, the functional devices 60 and 70 are connected in series. Therefore, the output data of the functional device 60 are supplied to the functional device 70, which inverts the data received from the functional device 60. The switching device 120 accordingly ensures that the input data arriving at the input ports 133, 134, 135 are processed in two stages, namely, initially in the functional device 60 and subsequently in the functional device 70. The functional device 70 is connected to the output port 141 by means of the switching device 120. This ensures that the output process data are transmitted from the functional device 70 to the destination actuator 161 via the output port 141.

According to one implementation by way of example, the switching device 120 also ensures that the input data arriving at the input port 136 from the sensor 156 pass through the controller 80, and as corresponding output data are transmitted as output data to the actuator 162 via the output port 142. Similarly, the remaining functional devices 90 through 110 may be switched between corresponding input ports and output ports via the switching device 120.

It is noted at this point that additional functional devices may be added to the functional devices 50 through 110 illustrated by way of example. Depending on the configuration of the switching device 120, one or more functional devices may be interconnected, and connected between a selected input port and output port in order to map received input process data onto output process data according to a predetermined overall function.

The connection device 40 may be configured with regard to the connection of the input ports to output ports and the corresponding interconnection of functional devices via the higher-order control device 20 or some other external device. The configuration parameters, such as the port number of the particular input ports and output ports and an identification of the functional devices to be connected in between, may be stored in the connection device 40 in the form of a look-up table. The switching device 120 may access the look-up table in order to establish the appropriate connections.

Due to the invention, it is possible to more quickly transmit output process data to a destination actuator. This is because the input process data provided by the sensors now no longer have to be transmitted to the higher-order control device 20 via the connection device 40 and mapped onto output process data there. Instead, the input process data are processed directly in the connection device 40 itself, and then cyclically transmitted as output process data to a destination actuator.

However, the input and output process data may still be monitored and observed by the higher-order control device 20. In addition, the higher-order control device may communicate acyclically with the field devices in a conventional manner, as is necessary, for example, in the case of diagnostics or malfunctions.

What is claimed is:

1. A communication system for connecting field devices to a higher-order control device, having a connection device which is connectable to a higher-order control device via a transmission medium, the connection device having at least one first port to which a field device which generates input data is connected, and at least one second port to which a field device which receives output data is connected, wherein the connection device has multiple different functional devices and a programmable switching device, the switching device being designed in such a way that it is able to switch at least one of said multiple different functional devices between the at least one first port and the at least one second port, the at least one functional device being designed to generate output data intended for the second port in response to the input data arriving at the first port, wherein the at least one functional device maps the input data onto the output data, and wherein configuration parameters are stored in the connection device for configuring the connection device with regard to the connection of the at least one first port to the at least one second port and the corresponding interconnection of the functional devices.

2. The communication system according to claim 1, wherein the field devices are IO-Link devices, in particular sensors or actuators, and that the connection device communicates with the particular IO-Link devices via point-to-point connections according to the IO-Link protocol.

3. The communication system according to claim 1, wherein the input data and output data contain process data which are transmitted cyclically.

4. The communication system according to claim 1, wherein the input data arriving at a first port contain the port number of the respective first port, and that the output data departing at a second port contain the port number of the respective second port.

5. A connection device, in particular for a communication system, for connecting field devices to a higher-order control device, the connection device being connectable to a higher-order control device via a transmission medium, and having at least one first port to which a field device which generates input data is connectable, and at least one second port to which a field device which receives output data is connectable, characterized by multiple different functional devices and a programmable switching device, the switching device being designed in such a way that it is able to switch at least one of said multiple functional devices between the at least one first port and the at least one second port, the at least one functional device being designed to generate output data intended for the second port in response to the input data arriving at the first port, wherein the at least one functional device maps the input data onto the output data, and wherein configuration parameters are stored in the connection device for configuring the connection device with regard to the connection of the at least one first port to the at least one second port and the corresponding interconnection of the functional devices.

* * * * *